3,373,024
ESTROGENIC COMPOUNDS AND ANIMAL
GROWTH PROMOTERS
Edward B. Hodge, Phil H. Hidy, and Herbert L. Wehrmeister, Terre Haute, Ind., assignors to Commercial Solvents Corporation, a corporation of Maryland
No Drawing. Continuation-in-part of application Ser. No. 530,362, Feb. 28, 1966, which is a continuation-in-part of application Ser. No. 432,811, Feb. 15, 1965. This application Mar. 3, 1967, Ser. No. 620,256
10 Claims. (Cl. 99—2)

ABSTRACT OF THE DISCLOSURE

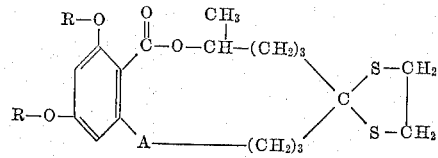

where A is selected from the group consisting of

and —CH$_2$CH$_2$—, and R is selected from the group consisting of hydrogen, lower alkyl, e.g. methyl and lower saturated acyclic acyl, e.g., acetyl, and animal feeds containing growth promoting amounts thereof.

---

This application is a continuation-in-part of copending application Ser. No. 530,362, filed Feb. 28, 1966, now abandoned, which is a continuation-in-part of copending application Ser. No. 432,811, filed Feb. 15, 1965, now Patent No. 3,239,341.

The present invention relates to new compounds and an object of the present invention is to provide compounds which exhibit estrogenic activity or aid in increasing the rate of growth in meat-producing animals, e.g., cattle, lamb and swine.

A conventional formula for the compounds of the present invention is:

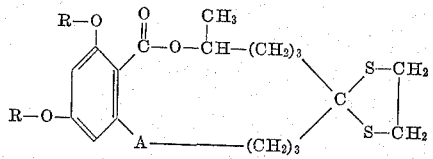

where A is —CH$_2$—CH$_2$— or —CH=CH—; R is hydrogen, substituted or unsubstituted alkyl, e.g., lower alkyl such as methyl, ethyl, hexyl, etc., and acyl, e.g., lower saturated acyclic acyl radicals such as acetyl and valeryl, but hydrogen is preferred. Compounds having the above formua where R is substituted or unsubstituted aryl, e.g., phenyl and bromophenyl, and aralkyl, e.g., benzyl, are also contemplated by the present invention.

The compounds can be administered to animals by any suitable method including oral and parenteral administrations. For example, the compounds can be blended with ordinary feed containing nutritional values in an amount sufficient to produce the desired rate of growth and can thus be fed directly to the animals, or the compound can be suspended in a suitable injection suspension medium such as peanut oil and injected parenterally. The amount of compound fed to an animal, of course, varies depending upon the animal, desired rate of growth and the like.

When the new compounds are to be administered in feeds, an animal feed composition may be prepared containing the usual nutritionally-balanced quantities of carbohydrates, proteins, vitamins and minerals together with the compound of the present invention. Some of these usual dietary elements are grains, such as ground grain and grain by-products; animal protein substances, such as those found in fish meal and meat scraps; vegetable proteins like soybean oil meal or peanut oil meal; vitaminaceous materials, e.g., vitamin A and D mixtures; riboflavin supplements and other vitamin B complex members; and bone meal and limestone to provide minerals. A type of conventional feed material for use with cattle includes alfalfa hay and ground corn cobs together with supplementary vitaminaceous substances if desired.

The compounds of the present invention can be produced from the compound:

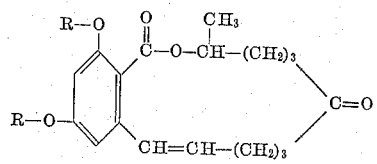

hereinafter referred to as the fermentation estrogenic substance (F.E.S.) by reaction with 1,2-ethane dithiol to produce F.E.S. ethylene thioketal. In producing compounds of the present invention where A is

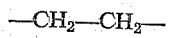

the olefinic bond of F.E.S. can be reduced, for example, by hydrogenation in the presence of a Group VIII metal, particularly platinum or palladium catalyst on a suitable carrier, e.g., charcoal. Generally, the catalyst contains from about 0.01 to about 10% of the catalytic metal. The catalyst is used in a ratio of generally from 0.02 to 2 grams of catalyst, preferably about 0.1 to 0.5 gram, and particularly about 0.2 gram catalyst per gram of F.E.S. The reduction may be carried out while the F.E.S. is dissolved in a suitable solvent, e.g., an alcohol, especially a lower alkanol such as 2-propanol, methanol, ethanol, and acid, e.g., acetic acid, etc. at ambient temperatures; e.g., from about 15° to 40° C., and ambient pressures, since only the presence of hydrogen is required; however, it is preferred to utilize an elevated pressure, e.g., from about 1 to 50 atmospheres of hydrogen.

In producing compounds of the present invention where R is alkyl, conventional alkylation procedures can be used to replace the H atom of one or both of the OH groups on the benzene ring of F.E.S. with an alkyl group. Alkylated dihydro F.E.S. compounds can be produced, for example, by first alkylating F.E.S. and then reducing it as set forth supra, or by first reducing it and then alkylating it. The alkylation can be by reaction with the corresponding dialkyl sulfates, e.g., dimethyl sulfate, diethyl sulfate, etc., to produce the dialkyl F.E.S. or a monoalkyl F.E.S. with the alkyl group replacing the hydrogen of the hydroxyl group on the benzene ring ortho to the ester group. Furthermore, a monomethyl F.E.S. compound with the methyl group replacing the hydrogen of the hydroxyl group para to the ester group can be selectively produced using diazomethane.

In producing compounds of the present invention where R is acyl, conventional acylation procedures can be used to replace the hydrogen atom of one or both of the hydroxyl radicals on the benzene ring of F.E.S. with an acyl radical. Acylated F.E.S. compounds can be produced, for example, by reaction with the corresponding acid anhydride, e.g., acetic anhydride, propionic anhydride, etc., catalyzed with, for example, sodium acetate or pyridine. Ambient conditions can be used although it is preferred to keep the reaction mixture cold. When compounds having one R as alkyl and the other acyl, it is advantageous to alkylate before acylating.

The fermentation estrogenic substance (F.E.S.) is so named since a convenient method for producing it is by cultivating, on a suitable nutrient medium, the organism *Gibberella zeae* (Gordon) on deposit at the Northern Utilization Research and Development Division of the United States Department of Agriculture under the number NRRL–2830.

The following examples are offered to illustrate this invention; however, the invention is not limited to the specific materials, amounts, and procedures set forth. The first example illustrates preparation of a suitable inoculum containing the organism *Gibberella zeae* (Gordon) NRRL–2830.

*Example I*

A spore sand culture containing *Gibberella zeae* (Gordon) NRRL–2830 was aseptically placed in a sterile tube containing 15 milliliters of Czapek's-Dox solution and a small amount of agar. This medium was then incubated for about 168 hours at approximately 25° C. At the end of the incubation period, the medium was washed with 5 milliliters of sterile deionized water and transferred to a sterile tube containing 45 milliliters of Czapek's-Dox solution. The contents of the tube were then incubated for about 96 hours at about 25° C. after which the material was available for use in inoculation of a fermentation medium.

The following example illustrates the fermentation of the organism *Gibberella zeae* (Gordon) NRRL–2830 to produce F.E.S.

*Example II*

To a 2 liter flask were added 300 grams of finely divided corn. The flask and its contents were then sterilized and after sterilization 150 milliliters of sterile deionized water were added. To the mixture in the flask were then added 45 milliliters of the inoculum prepared by the process of Example I and the material was thoroughly mixed. The mixed material was then incubated for about 20 days at 25° C. in a dark room in a water-saturated atmosphere.

The following example illustrates the recovery F.E.S. from the fermentation medium.

*Example III*

A 300 gram portion of fermented material produced by the method of Example II was placed in 500 milliliters of deionized water and slurried. The slurry was then heated for about 15 minutes at 75° C., 300 grams of filter aid were then added and the material was filtered. The solid filtered material containing the anabolic substance was then air dried, and 333 grams of the dried cake were then extracted with 500 milliliters of ethanol. This procedure was repeated three more times. The ethanol extract was evaporated to dryness under vacuum to give 6.84 grams of solid material. This solid material was then dissolved in 20 milliliters of chloroform and extracted with 30 milliliters of an aqueous solution containing 5% by weight of sodium carbonate having an adjusted pH of about 11.2. The extraction process was repeated seven more times. The pH of the sodium carbonate extract was then adjusted to 6.2 with hydrochloric acid, to yield an anabolic substance-containing precipitate. The precipitate and the aqueous sodium carbonate extract were then each in turn extracted with 75 milliliters of ethyl ether. This procedure was repeated three more times to yield a light yellow ethereal solution, which was then evaporated to yield 116 milligrams of solid anabolic substance. This material was then subjected to multiple transfer countercurrent distribution using 100 tubes and a solvent system consisting of two parts chloroform and two parts carbon tetrachloride as the lower phase and four parts methanol and one part water as the upper phase, all parts by volume. The solid material obtained from the multiple transfer countercurrent distribution was F.E.S.

*Example IV*

F.E.S. in an amount of 2 grams is refluxed in 100 cc. benzene containing 2 milliliters of 1,2-ethane dithiol and 0.2 gram paratoluene sulphonic acid as an acidic catalyst for 2 hours and thereafter cooled to room temperature and washed with a 5% solution of sodium bicarbonate. Excess benzene and 1,2-ethane dithiol are distilled off and the residue dissolved in boiling isopropyl alcohol. Upon cooling and addition of a small amount of water the product 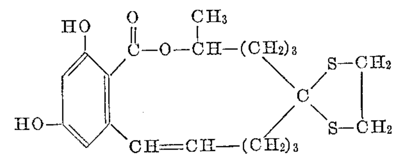 precipitates out.

*Example V*

Two 10 gram portions of F.E.S., each in 200 milliliters acetic acid, were catalytically reduced at room temperature in the presence of 1.2 grams of PdO catalyst at a hydrogen pressure of about 45 p.s.i. The combined reduction mixtures were heated to boiling, filtered, and the filter cake was washed with 50 milliliters of hot acetic acid. The cooled filtrate was added, with stirring, to 2 liters of water. The mixture was stirred for 15 minutes and the white solid was collected by filtration, washed and dried in a vacuum desiccator to yield 19.1 grams of dihydro F.E.S. having a melting point of 191°–193° C.

The dihydro F.E.S. (1 gram) is reacted with 1,2-ethane dithiol according to the procedure of Example IV to yield a compound having the formula:

The following example illustrates the production of a monomethyl F.E.S. derivative wherein a methyl group replaces the hydrogen in the hydroxyl group para to the ester group of F.E.S.

*Example VI*

Nitrosomethylurea in an amount of 1.2 grams was slowly added to a cold mixture of 3.6 milliliters of 50% potassium hydroxide and 17 milliliters of ether. After a few minutes the yellow ether layer of the mixture was decanted, dried over potassium hydroxide, and then added to a solution of 0.30 gram F.E.S. in 17 milliliters of ether. The resulting yellow mixture was left overnight in a loosely stoppered flask and then ether and diazomethane were evaporated using a steam bath. The remaining gummy residue was crystallized by adding 3 milliliters of water, heating to 60° C., and adding ethanol almost to solution. On cooling, crystals formed yielding 0.137 gram of a product having a melting point of 111°–116° C. which was recrystallized in the same way to yield 0.082 gram of monomethyl F.E.S. having a melting point of 120°–122° C. and analyzing:

Calc. ($C_{19}H_{24}O_5$): C, 68.7%; H, 7.28%; $OCH_3$, 9.34%.
Found: C, 68.3%; H, 7.38%; $OCH_3$, 9.17%.

The p methyl F.E.S. is substituted for the dihydro F.E.S. in following essentially the procedure used in Example IV to produce a compound having the formula:

The following example illustrates the production of dimethyl F.E.S. and monomethyl F.E.S. derivatives, the monomethyl F.E.S. derivative having the hydrogen in the hydroxyl group ortho to the ester group replaced with a methyl group.

*Example VII*

Dimethyl sulfate (5 milliliters) was added to a solution of 2.24 grams of F.E.S. in 80 milliliters 10% NaOH and 20 milliliters water. The mixture was stirred for one-half hour at 18°–20° C. (cooling bath) and an additional 5 milliliters of dimethyl sulfate was added. After an additional 70 minutes of stirring at 20°–26° C., the solid precipitate, Solid A, was collected by filtration, washed with water and dried in a vacuum desiccator. The filtrate from Solid A was acidified with 25 milliliters 12 N $H_2SO_4$ to yield a second precipitate. Solid B which was collected, washed with water, and dried.

Solid A (0.79 gram having a melting point of 114°–118° C.) was recrystallized from a mixture of 10 milliliters water and 15 milliliters ethanol to yield 0.66 gram of dimethyl F.E.S. having a melting point of 108°–110° C.

Solid B (1.39 grams having a melting point of 152°–162° C.) was recrystallized twice from a mixture of water and alcohol to yield 0.8 gram of monomethyl F.E.S. having a melting point of 169°–174° C. and the following analysis of recrystallized Solid B (monomethyl F.E.S) was obtained:

Calc. ($C_{19}H_{24}O_5$): C, 68.65%; H, 7.28%; OMe, 9.34%. Found: C, 67.97%; H, 7.16%; OMe, 9.28%.

Each of the o methyl F.E.S. and the dimethyl F.E.S. is substituted for the F.E.S. in the procedure of Example IV to produce the respective compounds:

and

*Example VIII*

Dimethyl F.E.S. (2 grams) was refluxed in 100 millimeters ethanol containing 0.2 gram p-toluene sulphonic acid and 5 grams 1,2-ethane dithiol for 8 hours. Upon cooling of the reaction mixture dimethyl F.E.S. ethylene thioketal, white to light yellow crystals, melting point 144 to 146° C., precipitated out.

The following example illustrates the production of an acylated monomethyl F.E.S. derivative.

*Example IX*

To a solution of 368 milligrams of p-methyl F.E.S. in 8 milliliters pyridine is added 5 milliliters acetic anhydride and the mixture is held at room temperature for 16 hours. Twenty-five milliliters of water are then added. The mixture is stored in a refrigerator for 2 hours. The solid precipitated is collected by filtration, washed with water and dried in a vacuum desiccator to recover a compound which is substituted for the F.E.S. in the procedure of Example IV to produce a compound of the formula:

which is recovered.

*Example X*

The compound:

is produced by substituting o-methyl F.E.S. for the p-methyl F.E.S. in the procedure of Example IX.

The production of the dimethyldihydro F.E.S. derivative is illustrated by the following example.

*Example XI*

Dihydro F.E.S. (556 milligrams) was dissolved in 25 milliliters 10% NaOH and 10 milliliters water and the solution was stirred. To the stirred solution was added three, two-milliliter portions of dimethyl sulfate at half hour intervals followed by stirring for an additional hour. The mixture was acidic and it was made alkaline by the addition of 10 milliliters 10% NaOH and the alkaline mixture was stirred for one-half hour. The solid formed was collected by filtration, washed with water and dried in a vacuum desiccator. The product weighed 526 milligrams and melted at 115°–117° C. Recrystallization from a mixture of 10 milliliters of water and 25 milliliters of ethanol provided 371 milligrams of material having a melting point of 124°–125.5° C. It was analyzed with the following results:

Calc. ($C_{20}H_{28}O_5$): C, 68.95%; H, 8.10%; $CH_3O$, 17.81%. Found: C, 69.02%; H, 8.12%; $CH_3O$, 17.81%.

The dimethyldihydro F.E.S. is substituted for F.E.S. in the procedure set forth in Example IV to produce a compound having the formula:

*Example XII*

A mixture of 2.0 grams F.E.S. dimethyl ether, 100 milliliters of benzene, 0.2 gram p-toluenesulfonic acid and 5 grams of 1,2-ethanedithiol was refluxed for 8 hours, then concentrated to dryness. The residue was taken up in 60 milliliters of hot ethanol which was cooled, then filtered to give 1.48 grams, M.P. 137–147° C. Two further recrystallizations from 50-millimeter and 40-milliliters portions of ethanol gave 0.28 gram, M.P. 144–146° C.

Calculated: carbon 62.52; hydrogen 7.16. Found: carbon 62.52; hydrogen 7.16.

Calculated: C, 62.52; H, 7.16; S, 15.17. Found: C, 61.12; H, 6.70; S, 14.21.

*Example XIII*

Six head of cattle are fed a daily ration including a mixture of alfalfa hay and ground corn cobs containing from 1 to 20 ounces of the compound produced in Example IV per hundred pounds of ration to increase the rate of growth of the cattle.

Example XIV

Six head of cattle are fed a daily ration including a mixture of alfalfa hay and ground corn cobs containing from 1 to 20 ounces of the compound produced in Example XI per hundred pounds of ration to increase the rate of growth of the cattle.

The following are specific examples of animal feed compositions of this invention useful for increasing the rate of growth and feed efficiency of young animals to market weight.

Example XV

For young beef cattle, i.e., calves to yearlings running to two year olds, each animal is given 5 to 20 milligrams per day of the compound produced in Example IV intimately admixed in about 18 to 22 pounds per head per day of a complete pelleted ration for about 180 days. The complete pelleted ration includes in addition to the compound of Example IV the following:

| | |
|---|---|
| Barley _____percent__ | 40–43 |
| Molasses dried beet pulp _____do____ | 34.5–37.5 |
| Alfalfa pellets _____do____ | 8.0 |
| Tallow _____do____ | 2.5 |
| Calcium carbonate _____do____ | .30 |
| Urea _____do____ | .30 |
| Phosphorus source _____do____ | .40 |
| Salt _____do____ | .50 |
| Molasses _____do____ | 10.00 |
| Trace mineral _____do____ | 0.5 |
| Vitamin A _____MMI.U./ton__ | 2–4 |

Note.—Milo or corn, for example, can be substituted for the barley.

The compound of Example IV is admixed with the above ingredients in a stationary blender or a feed mix truck in the following amounts in grams per ton to provide an appropriate complete pelleted feed with dosage levels ranging from 5 to 90 milligrams per head per day.

| Grams/ton: | Mg./head/day |
|---|---|
| .5 | 5 |
| 1.0 | 10 |
| 2.0 | 20 |
| 4.0 | 40 |
| 8.0 | 80 |

These gram amounts are premixed with, for example, 10 pounds of soybean hulls prior to admixture with the other ingredients.

Example XVI

For young swine, i.e., six week old pigs to about 100 pound pigs, each animal is given 5 to 20 milligrams per day of the compound of Example V intimately admixed in about 1½ to 5½ pounds per head per day of a grower ration until it reaches a weight of about 100 pounds. When the swine weigh between 90 and 125 pounds the feed is changed to one whereby each animal is given 20 to 50 milligrams per day of the compound of Example V intimately admixed in about 5½ to 10 pounds per head per day of a finisher ration until it reaches market weight of about 220 pounds. The grower and finisher ration include in addition to the compound of Example V the following:

| | Grower, Percent | Finisher, Percent |
|---|---|---|
| Ground Yellow Corn | 77 | 86.7 |
| Soybean Meal (44% protein) | 16 | 6.5 |
| Meat and Bone Scraps (50% protein) | 2.5 | 2.5 |
| Dehydrate Alfalfa Meal (17%) | 2.5 | 2.5 |
| Steamed Bone Meal | 0.5 | 0.5 |
| Ground Limestone | 0.5 | 0.3 |
| Iodized Salt | 0.5 | 0.5 |
| Vitamin, Antibiotic and Trace Mineral Premix | 0.5 | 0.5 |

The compound of Example V is admixed with the above ingredients in a blender in the following amounts in milligrams per pound to provide an appropriate feed with dosage levels ranging from 6 to 96 milligrams per head per day.

| Mg./Pound: | Mg./head/day |
|---|---|
| 2 | 6 |
| 4 | 12 |
| 8 | 24 |
| 16 | 48 |
| 32 | 96 |

Example XVII

For 4 to 10 month old lambs weighing 50 to 70 pounds, each animal is given 1 to 15 milligrams per day of the compound of Example VI, intimately admixed in about 3 to 6 pounds per head per day of a complete ration for 30 to 90 days. The complete ration includes in addition to the compound of Example VI the following:

| | Lbs. |
|---|---|
| Finely ground corn cobs | 630 |
| Ground corn | 600 |
| Dehydrated alfalfa meal | 300 |
| Dried molasses | 120 |
| Soybean meal (44% protein) | 300 |
| Dicalcium phosphate | 14 |
| Trace mineral salt | 17 |
| Premix vitamin, mineral and antibiotic | 19 |

The compound of Example VI is admixed with the above ingredients in a blender in the following amounts in milligrams per pound to provide an appropriate complete feed with dosage levels ranging from 1 to 15 milligrams per head per day.

| Mg./pound: | Mg./head/day |
|---|---|
| .5 | 2 |
| 1.0 | 4 |
| 1.5 | 6 |
| 2.0 | 8 |
| 2.5 | 10 |
| 3.75 | 15 |

Example XVIII

For broilers, i.e., day old to four week old chicks, a grower feed is prepared for feeding to the chicks for the first four weeks and a finisher feed is prepared for feeding the four week old chicks for the last five weeks until they reach market weight of two and a half to three pounds dressed. For each pound of weight gain, the chicks eat about 1.5 to 2 pounds of feed. Thus they eat about 1.5 pounds of feed during the first four weeks and about five pounds of feed during the next five weeks. During the course of this feeding schedule, each bird should receive a total of about 12 to 36 milligrams of the compound of Example X in the grower and finisher feed each of which includes in addition to the compound of Example X the following:

| | Grower (lbs.) | Finisher (lbs.) |
|---|---|---|
| Ground Yellow Corn | 1,000 | 1,200 |
| Soybean Meal (44% Protein) | 700 | 500 |
| Fish Meal (60% Protein) | 100 | 80 |
| Alfalfa Meal | 50 | 50 |
| Meat and Bone Scraps | 0 | 30 |
| Animal Fat | 80 | 80 |
| Dicalcium Phosphate | 35 | 40 |
| Iodized Salt | 10 | 10 |
| Limestone | 15 | |
| Premix Vitamins, Trace Minerals and Antibiotics | 10 | 10 |

It is claimed:
1.

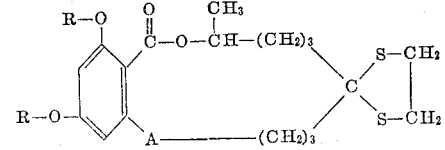

where A is selected from the group consisting of

—CH=CH— and —CH₂CH₂— and R is selected from the group consisting of hydrogen, lower alkyl and lower saturated acyclic acyl.

2. The compound of claim 1 wherein A is

—CH=CH—

3. The compound of claim 2 wherein R is hydrogen.
4. An animal feed comprising a nutritional diluent and growth promoting amounts of the compound of claim 1.
5. The compound of claim 2 wherein R is methyl.
6. The compound of claim 2 wherein the R ortho to the ester group is methyl and the other R is hydrogen.
7. The compound of claim 2 wherein the R para to the ester group is methyl and the other R is hydrogen.
8. The compound of claim 1 wherein A is

—CH₂—CH₂—

9. The compound of claim 8 wherein R is hydrogen.
10. The compound of claim 8 wherein R is methyl.

No references cited.

A. LOUIS MONACELL, *Primary Examiner.*

H. H. KLARE, *Assistant Examiner.*